June 4, 1940.  J. V. L. HOGAN ET AL  2,202,855
FACSIMILE RECORDER
Filed Sept. 14, 1938  2 Sheets—Sheet 2
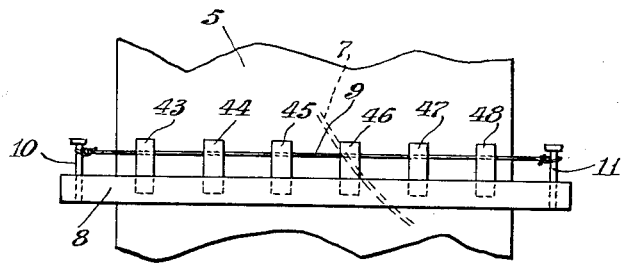
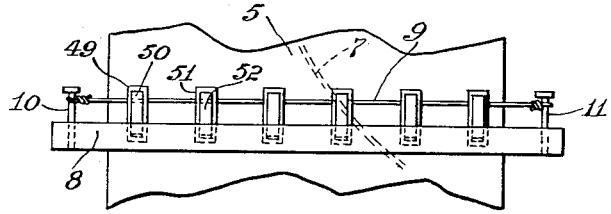
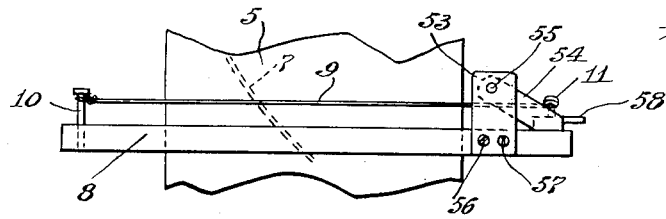
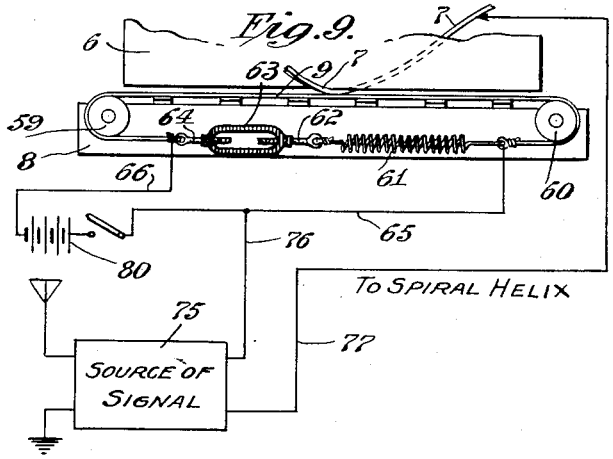
John V. L. Hogan
Hugh C. Ressler
INVENTORS
BY Alfred W. Barber
ATTORNEY Patented June 4, 1940

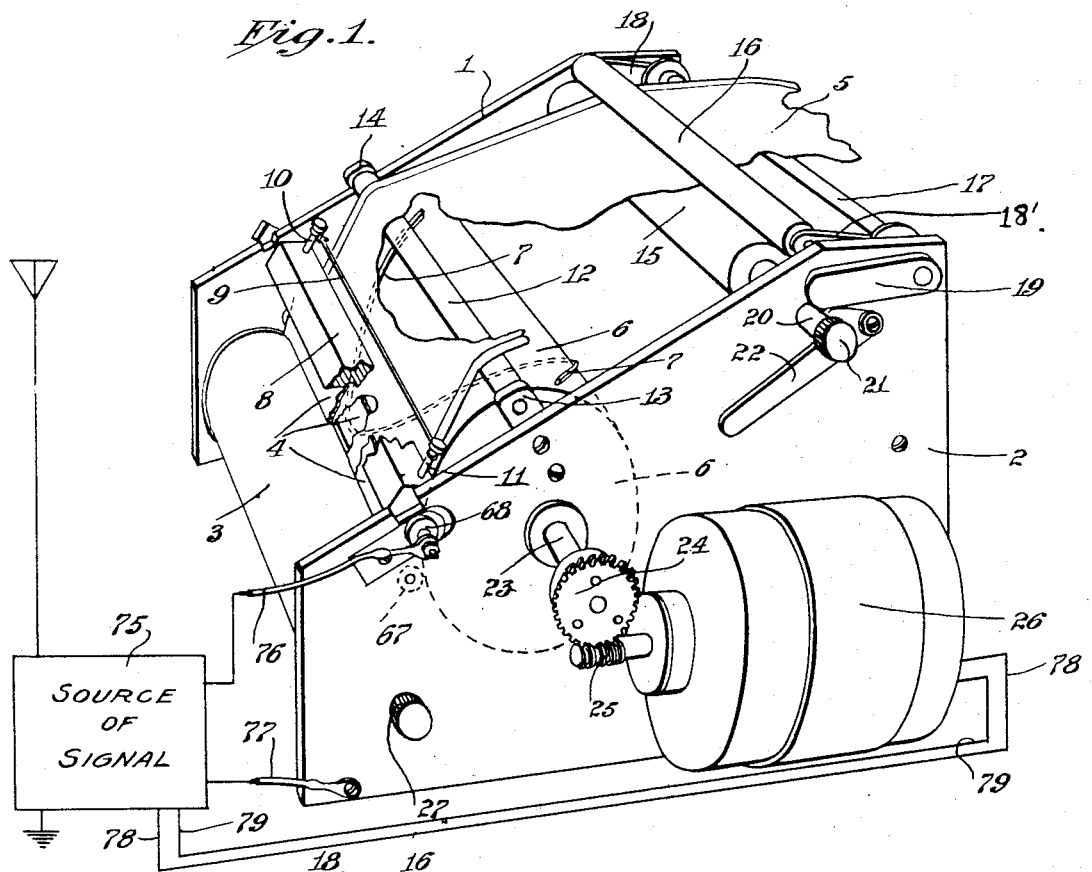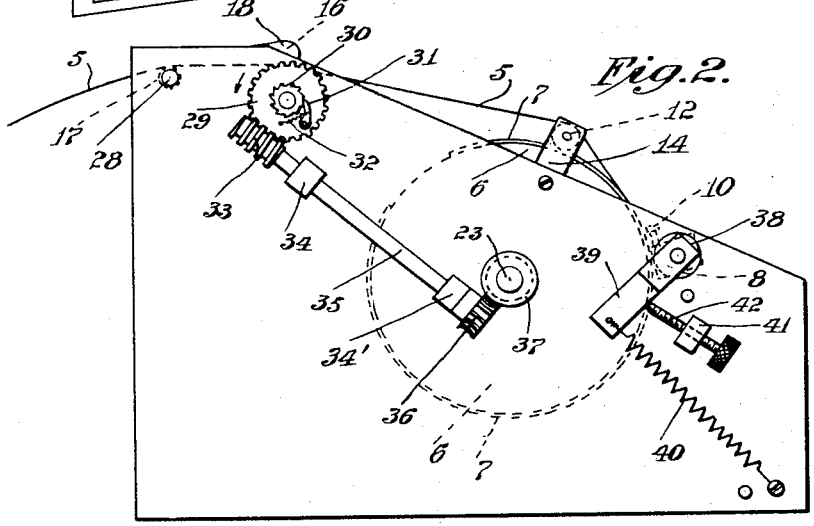

2,202,855

UNITED STATES PATENT OFFICE 2,202,855

FACSIMILE RECORDER

John V. L. Hogan, Forest Hills, and Hugh C. Ressler, Richmond, N. Y., assignors to Radio Inventions, Inc., New York, N. Y., a corporation of New York Application September 14, 1938, Serial No. 229,980

18 Claims. (Cl. 178—11)

The present invention relates to facsimile recorders of the drum and helix type.

One object of the present invention is to provide a flexible electrode structure in a drum and helix recorder whereby improved recording on electrolytic paper may be accomplished.

Another object is to provide an electrode structure having stable and controllable elastic properties, so placed and supported as to permit high detail in facsimile recording without requiring precise machine work in manufacture.

Other objects are to provide means for varying the pressure on the recording sheet with equal ease whether the recorder is in operation or at rest, and to provide for maintaining the pressure desired, for any particular recording condition, substantially free from variations caused by changes in thickness of the record paper, by lack of precision of moving electrode position, by vibration of the recorder, and the like.

A further object is to provide means for heating the flexible linear electrode so that recording in certain cases may be improved.

Still another object is to provide a helix and linear electrode construction which concentrates recording signal current by keeping the linear electrode out of contact with the paper except at the recording point where the helix and electrode intersect.

Another object is to provide means for rapidly inserting a new linear electrode.

Various types of drum and helix recorders have been devised and used in the past. Drum and helix recorder is intended to designate a recorder of the general form employing a helical electrode mounted on a rotating drum and a second straight electrode mounted parallel to the axis of the drum wherein recording takes place at the intersection of the two electrodes. In general this type of recorder has been of the impact printing type, employing a drum and helix and a stiff printing bar for impressing an inked ribbon or carbon paper upon a record sheet passed between the helix and the bar. A resilient mounting for the helix has been used to adapt this type of recorder to use in electro-chemical recording with electrolytic paper.

An important aspect of this invention is that many of the foregoing objects may be obtained and thus that greatly improved results in electrolytic recording are had by using a flexible, low inertia electrode properly supported and bearing against the paper at the intersection with the helix. This electrode, in its preferred form, is a relatively fine wire, supported under tension parallel to the axis of the drum and flexibly held against the recording sheet and helix by spring fingers suitably placed along the wire. In this way, constant pressure is maintained over the full length of the helix.

The wire electrode has the added advantage that it may be heated by a direct current in addition to the electrolytic recording current whereby certain electrolytic reactions are promoted by the addition of heat at the point of contact. A more detailed description of the mode of operation and the various phases of the invention will be given in connection with the various figures of the drawings.

In the drawings:

Fig. 1 shows a perspective view of a facsimile recorder embodying one form of the present invention.

Fig. 2 shows an end view of the recorder of Fig. 1.

Fig. 3 shows one form of wire electrode support.

Fig. 4 shows an end view of the electrode support of Fig. 3.

Fig. 5 shows a modified electrode support.

Fig. 6 shows an end view of the electrode support of Fig. 5.

Fig. 7 shows another form of electrode support.

Fig. 8 shows a detail of Fig. 7.

Fig. 9 shows heating circuit means added to an electrode support of the form of Fig. 3 or Fig. 5.

Fig. 10 shows the raised helical structure.

In Fig. 1 is shown a perspective view of a recorder embodying one form of wire electrode. The recorder comprises end supports 1 and 2, paper magazine 3 having an extension 4 for protecting the paper from drying out up to a point near the point of marking, drum 6, metallic helical ridge 7, wire electrode support bar 8, wire electrode 9, supported on pins 10 and 11, mounted on bar 8, drive motor 26 and guide rollers 67, 12, 15 and 16. Drum 6 is driven by motor 26 through suitable gears as worm 25 and worm gear 24 driving drum shaft 23. The record paper 5 is fed from container 3 clamped by screw 27, through the protective channel 4, under lower guide roller 67 which guides it against drum 6. Paper 5 then passes upward over drum 6, under the wire electrode 9, over guide roller 12, over feed roller 15, under roller 16 and over shaft 17. Roller 15 is driven from motor 26 as is shown in Fig. 2 and roller 16 serves to hold paper 5 in contact with feed roller 15 so that it will pull it positively. Roller 15 may also be turned by hand by means of knob 21 turning shaft 20 of roller 15 whereby the paper may be advanced rapidly to a suitable recording point. In addition, lever 22 may be raised to lift bar 19 and thus to rotate shaft 17 so as to raise roller 16 by means of bars 18 and 18', thereby releasing the paper so that it may be pulled through by hand. Idler roller 12 is held by the supports 13 and 14. For electrolytic scanning, bar 8 (holding electrode 9) may be insulated from the scanner frame by insulating bushings 68 and 38 (Fig. 2) and signal voltages may then be applied between wire 9 and helix 7 by electrical connections to support bar 8 and frame 1—2 as shown by wires 76 and 77.

The end view of Fig. 2 shows countershaft 35 driven by gear 36 from gear 37 on the drum shaft. Shaft 35 is supported by bearings 34 and 34' and drives gear 29 thru gear 33. Gear 29 drives feed roller 15 by means of ratchet 30 and pawl 31 held in engagement by spring 32. This ratchet drive permits hand feed of the paper by knob 21 as described in connection with Fig. 1 and still provides a positive motor driven feed. End 28 of shaft 17 is shown. Wire support bar 8 is connected to arm 39 which is held by spring 40 against screw 42, preferably in such position that wire 9 is pressed against paper 5 at the point of intersection between it and helix 7. Screw 42 mounted in a tapped block 41 permits adjustment of the position of 39 and 8 so that the pressure of wire 9 against the paper and helix may be properly determined. Insulating bushing 38 is shown and arm 39 may also be of insulating material to prevent shorting the signal circuit.

In operation signals from a suitable receiver or coupling device 75 are applied between wire 9 and helix 7 through wires 76 and 77. Drum 6 is rotated at a synchronous speed by motor 26 which is driven or synchronized from the receiver or coupling device over wires 78 and 79. As drum 6 rotates, the point of contact between helix 7 and wire 9 through paper 5 travels along the paper from side to side and then suddenly starts over again. The marking stroke may consume 85% of the operating time by making the helix encircle 85% of the circumference of the drum. The remaining 15% of time consumed in returning to the starting point will hence not mark and may be used as a synchronizing period.

One practical form of the recorder takes a roll of electrolytic paper 8½" wide. The synchronous driving motor, rotating at 1800 R. P. M., advances this paper at the rate of 2 linear inches or 17 square inches per minute and rotates the drum 6 and helix 7 at 200 R. P. M. Thus 100 scanning lines are recorded per linear inch. The scanning rate and paper width may be changed to meet varying service conditions, a sheet 4" wide being suitable for many portable services and a sheet 17" wide being adapted for full size newspaper page reproduction.

The wire electrode 9 being very flexible permits the paper to rise at the point of contact between wire 9 and helix 7 and a raised ripple of paper will travel across the drum. The point of contact through the paper at the intersection of wire 9 and helix 7 is very fine and forms the marking point when current is passed through the paper. This recorder employing a wire electrode is particularly intended for marking on electrolytic paper since this type of paper is, in general, used in a moist condition which tends to reduce its mechanical strength.

It is customary to use electrolytic paper which is either coated on one surface only or which is totally impregnated. Recording may occur on only a coated surface, or may be visible on both surfaces of the record sheet. When recording on one surface only it is preferred that such surface be next to the wire 9 or equivalent electrode, both because the record becomes visible immediately and because it has been found that with this arrangement there is far less tendency for the record marks to be "dragged" beyond their intended positions and for the sensitive surface to be damaged. However, facsimile recording may also be accomplished when the sensitive surface is next to the helical electrode 7.

Fig. 3 shows in general detail one form of wire electrode and its mounting. Wire 9 is supported between studs 10 and 11 mounted in bar 8. Wire 9 is held in proper position and pressed against the paper 5 and helix 7 by the spring fingers 43, 44, 45, 46, 47 and 48. These fingers may be of either thin metallic spring material or thin springy insulating material. The use of a number of these pressure fingers provides substantially constant pressure between wire and paper over the full width of the paper. The diagrammatic end view in Fig. 4 shows the relative relations of fingers 43 to 48, wire 9, paper 5, helix 7 and drum 6. It has been found useful in some cases to keep the paper contact with drum 6 at a minimum by suitable means for passing the paper over the wire rather than over the drum. If bar 8 is made of insulating material, the insulating fingers permit the application of a steady heating current to the wire 9 in addition to the signal voltages. The outlet of protective channel 4 may be brought still nearer to the marking point, if desired, by omitting or changing the position of roller 67.

Fig. 5 shows a modification of the spring fingers in the use of metallic springs 50, 52, etc., covered by insulating strips 49, 51, etc. Fig. 6 shows diagrammatically a side view of this arrangement. Thus springs 50, 52, etc., are insulated from wire 9. Wire 9 may line up with end supports 10—11 or it may pass in front of or behind them.

Fig. 7 shows a modified form of wire support in which wire 9 is somewhat longer than drum 6 so that only the center portion of the wire is used in marking. By using only the center portion, the pressure is maintained much more constant over the marking portion of the wire than if essentially the entire wire were used. If the full length of wire were used in marking, excessive wire pressure would be encountered near the ends.

In long continued use of the recorder, the wire electrode may be worn down so that, although the desired uniform pressure is properly maintained, the surface providing the marking contact becomes flattened and consequently some loss of definition results. After undue wear has occurred, the worn electrode should be replaced. To facilitate changing the wire electrode, support 11 is mounted on arm 54 pivoted at 55 on support 53 held by screws 56 and 57 which functions as a toggle as soon as wire 9 passes below the center of pivot 55. Projection 58 is provided for lifting the end of lever 54 to release the wire. Fig. 8 shows an end view of this form of wire mounting. With this arrangement, the wire 9 may be replaced in a few seconds with loss of very little of the material being recorded. This toggle mounting may, of course, be used in the structures shown in Figs. 3 and 5 as well.

Fig. 9 shows a wire mounting similar to that of Fig. 3 in which tension on the wire is maintained by a spring 61 and is made adjustable by the turnbuckle 62—63—64. If ring 63 is made of insulating material, as well as bar 8 or supports 59—60 and the spring fingers, a heating current may be passed through the wire 9 from a suitable source such as battery 80 over leads 66 and 65. Electrolytic action is in some cases facilitated by the addition of heat from the marking wire 9.

Fig. 10 shows a portion of drum 6 with a cross-section of helix 7. The form of helix here shown has an increased dimension perpendicular to the drum and serves to indent the paper 5 and electrode 9 to such an extent that paper 5 passes between drum 6 and electrode 9 without touching the electrode except at the intersection of helix 7. This concentrates the marking signal current into a path through the desired point of marking, and tends to increase the optical density of the resulting record. Although not so shown in Fig. 10, it is preferred that the helical electrode 7, of whatever cross-section may be desired, be seated in an appropriately cut helical groove in the surface of drum 6.

Helix 7 may be a wire of suitable cross-section secured at its ends to drum 6. In the form shown in Fig. 10 helix 7 may be a flat strip of metal wound around drum 6 with one edge secured to the drum so that its longer dimension is perpendicular to the surface of the drum. Helix 7 should be of conducting material for electrochemical recording and an electrical circuit to it may be completed thru drum 6, shaft 23 and end supports 1 and 2, or drum may be of insulating material and circuit provided to the helix through suitable hubs and brushes.

One requirement on the flexible electrode system is that it be free to follow irregularities in the paper, especially the raised point caused by the helix rotating behind the paper. Flexibility and resiliency throughout the length of the electrode, a high natural frequency, of the order of the frequency of the facsimile picture elements, or higher, low inertia and freedom, allowing for considerable motion perpendicular to the paper, are important features of the present electrode structure. The spring fingers produce substantially constant pressure between electrode and paper, along the length of the electrode, raise the natural frequency of the linear electrode and permit considerable motion perpendicular to the paper while maintaining substantialy constant pressure between electrode and paper. They also provide damping and tend to cause the wire to vibrate, if at all, in harmonic modes rather than the fundamental mode. By raising the natural frequency of mechanical vibration of the linear electrode to a value of or above the order of the picture element frequency, and by damping the wire vibrations, there is little tendency to lose definition by reason of pressure variations.

Small slots may be cut or indentations formed in the spring fingers to prevent the wire electrode from moving parallel to the plane of the paper, as shown at $a$ and $b$ in Fig. 6. Since the ends of the wire are secured against motion, the wire electrode is thus free to move in one plane, but is substantially rigid in the perpendicular plane. It is not only free to move as a unit in the one plane but various portions are free to move by different amounts. This is designated as flexibility in one plane and rigidity in a perpendicular plane.

The flexible electrode has been described as a wire but equivalent structures may be used, as for instance a unitary structure in which the edge of a sheet of thin flexible metal is rolled to form a combined spring mount and flexible electrode.

These and other modifications are possible within the spirit and scope of the invention as set forth in the appended claims.

The phrase "linear electrode" as used in the claims means an electrode providing a scanning line contact with the recording sheet, this line being in general perpendicular to the direction of paper motion and parallel to the axis of the helix and drum. By "helical ridge" is meant the helical electrode 7, in any of its various forms. By a "plane perpendicular to the recording sheet" is meant a practical path of motion for the linear electrode when supported substantially as shown, without limitation to a mathematically planar or perpendicular path.

In specifying that the linear electrode shall be "parallel" to the axis of the helix, it is meant that the relationship shall be parallel in a practical or operable sense, since it is one of the advantages of the construction disclosed herein that substantially the correct pressure for adequate marking, while protecting the record sheet from damage, will automatically be maintained even though the linear electrode is not mathematically parallel to the axis of the helix.

What is claimed is:

1. In a facsimile recorder, the combination of, a helical ridge for pressing against one side of a record sheet to form a slightly raised portion in said sheet, a flexible linear electrode, and springs for pressing said electrode against the other side of said record sheet wherein said electrode is flexible enough to at least partially conform to said raised portion.

2. In a facsimile recorder, the combination of, a helical ridge for pressing against one side of a record sheet to form a slightly raised portion in said sheet, a linear electrode, springs for pressing said electrode against the other side of said record sheet, wherein said electrode is flexible enough to at least partially conform to said raised portion, and means for passing an electric current along said linear electrode for heating it.

3. In a facsimile recorder, the combination of, a drum, a wire helix secured to the surface of said drum, a wire mounted parallel to the axis of said drum, means for drawing a record sheet between said helix and said wire, means for pressing said wire upon said sheet at the point of intersection with said helix, means for varying the steady pressure of said wire upon said sheet and helix and means for impressing signals to be recorded between said wire and said helix.

4. In a facsimile recorder, the combination of, a helical ridge for pressing against one side of a record sheet to form a slightly raised portion in said sheet, a linear electrode, springs for pressing said electrode against the other side of said record sheet, wherein said electrode is flexible enough to at least partially conform to said raised portion, and means for applying tension to said linear electrode along its length.

5. In a facsimile recorder, the combination of, a metallic helix, a metallic resiliently flexible linear electrode, means for holding said electrode substantially parallel to the axis of said helix while allowing substantial flexibility in a plane including said axis and said electrode, means for drawing a record sheet between said helix and said electrode, means for compressing said sheet between said helix and said electrode at one point, means for moving said point across at least a portion of said sheet, and means for applying signals to be recorded between said helix and said electrode.

6. In a facsimile recorder as set forth in claim 5, additional means for maintaining substantially constant pressure at said point throughout its length of travel.

7. In a recorder, the combination of, a helical electrode, a linear electrode flexible in a plane including itself and the axis of said helical electrode for marking upon a recording surface, and a plurality of springs for raising the natural frequency of said linear electrode.

8. In a recorder, the combination of, a helical electrode, a flexible linear electrode to cooperate with said helical electrode in marking upon a recording surface, and a structure for applying tension along the length of said linear electrode.

9. In a recorder, the combination of, a drum, a helical electrode at least partly encircling said drum and secured thereto, a wire mounted parallel to the axis of said drum, means for drawing a record sheet between said electrode and said wire, means for pressing said wire upon said sheet at the point of intersection with said electrode, means for varying the steady pressure of said wire upon said sheet, and means for impressing signals to be recorded between said wire and said electrode.

10. In a recorder, the combination of a drum, a metallic helix passing substantially 85 percent of the way around said drum, means for drawing a record sheet over at least a portion of said helix, a resiliently flexible linear electrode of substantially circular cross-section, means for securing said electrode parallel to the axis of said helix and in contact with said record sheet within said portion covering said helix, and means for impressing signals to be recorded between said electrode and said helix.

11. In a recorder, the combination of, a metallic helix, a resiliently flexible linear electrode of substantially circular cross-section, means for securing said electrode near its end points, means for mounting said electrode parallel to the axis of said helix, means for drawing a record sheet between said electrode and said helix, means for compressing said sheet between said electrode and said helix, means for rotating said helix, and means for impressing signals to be recorded between said electrode and said helix.

12. In a recorder, the combination of, a metallic helix, a resiliently flexible linear electrode of substantially circular cross-section, a supporting structure for holding said electrode substantially parallel to the axis of said helix, a paper feed device for drawing a record sheet between said electrode and said helix, an adjustable control for variably compressing said sheet between said electrode and said helix, a motor for rotating said helix about its axis, and a signal source for impressing signals to be recorded between said electrode and said helix.

13. In a recorder, the combination of, a helical electrode, a resilient linear wire electrode at least as long as the axis of said helical electrode secured in a position adjacent to said helical electrode and parallel to the axis of said helical electrode, and a paper pulling device for drawing a record sheet between said helical and linear electrodes.

14. In a recorder, the combination of, a metallic helical edge, a flexible metallic linear electrode of substantially circular cross-section mounted parallel to the axis of said helix, a sheet pulling device for drawing a record sheet between said edge and said electrode, a plurality of flexible fingers mounted in spaced relation along said electrode for pressing said electrode against said sheet, and a signal source for applying electrical signals to be recorded between said edge and said electrode.

15. In a recorder as set forth in claim 14, additional means for electrically insulating said fingers.

16. An electrode for an electrolytic recorder including a wire and a support for permitting said wire to progressively contact a record surface along the length of said wire.

17. In a recorder, an electrode including a linear marking edge flexible in a direction perpendicular to an adjacent recording surface, a source of electric current, and connections for passing at least a portion of said current thru said edge for raising its average temperature by a substantial amount.

18. In a recorder, the combination of, a helix, a linear electrode flexible at least in a plane including itself and the axis of said helix, means for mounting said electrode with its linear dimension substantially parallel to the axis of said helix, means for rotating said helix about its axis, and means for moving a record sheet between said helix and said linear electrode.

JOHN V. L. HOGAN.
HUGH C. RESSLER.